United States Patent [19]

Smith

[11] Patent Number: 5,285,043
[45] Date of Patent: Feb. 8, 1994

[54] SELF-ADJUSTING SPOT WELDING ELECTRODE HOLDER

[76] Inventor: Robert L. Smith, 2129 - 10th St., Wyandotte, Mich. 48192

[21] Appl. No.: 59,570

[22] Filed: May 12, 1993

[51] Int. Cl.⁵ .................. B23K 11/11; B23K 11/31
[52] U.S. Cl. ........................................ 219/87
[58] Field of Search ............ 219/86.9, 87, 86.25, 219/86.31, 86.33, 119, 120, 56.1

[56] References Cited

U.S. PATENT DOCUMENTS

| | | | |
|---|---|---|---|
| 2,979,599 | 4/1961 | Width | 219/87 |
| 3,558,848 | 1/1971 | Width | 219/87 |
| 3,692,970 | 9/1972 | Gött et al. | 219/56.1 |
| 5,111,015 | 5/1992 | Riordan | 219/119 |

FOREIGN PATENT DOCUMENTS

| | | | |
|---|---|---|---|
| 672682 | 2/1939 | Fed. Rep. of Germany | 219/86.9 |
| 277145 | 8/1970 | U.S.S.R. | 219/87 |

Primary Examiner—Geoffrey S. Evans
Attorney, Agent, or Firm—Charles W. Chandler

[57] ABSTRACT

A multiple-electrode spot welding apparatus has the inner ends of the electrode shanks disposed in a bed of small ball bearings in such a manner that when the electrode tips contact a workpiece, any uneven pressure applied by one of the electrodes moves the other electrodes to equalize the pressure applied by all electrodes. In another embodiment of the invention, the ends of each pair of electrode shanks have semi-spherical ends seated on a small tilt plate. The mid-section of the small tilt plate is seated on a small ball which, in turn, is seated on another larger tilt plate. The larger tilt plate is seated on a larger ball in such a manner that any imbalance in the pressure of certain electrode tips contacting the workpiece, causes the other electrode tips to move to balance the pressure of all the electrodes. A third embodiment uses a single ball mechanism to make a dual electrode fixture self-adjusting.

20 Claims, 2 Drawing Sheets

SELF-ADJUSTING SPOT WELDING ELECTRODE HOLDER

BACKGROUND OF THE INVENTION

Spot welding holders commonly employ multiple electrodes, each fixed in position. Some electrodes apply more pressure on the workpiece than other electrodes because of variations in workpiece thickness and electrode wear. The electrodes function best when they apply equal pressure on the workpiece, splitting the current evenly between the tips. Uneven tip pressure reduces the life of the electrodes.

Conventional practice is to file the inner ends of the electrode shanks to balance the tip pressure on the workpiece. This time-consuming process requires taking the holder apart to file the electrodes and then assembling the holder to determine whether the electrode pressure is even.

Typically, a conventional holder requires maintenance after processing 2,000 pieces.

Some holders are known for balancing the pressure applied by the electrode tips by some type of self-adjusting mechanism. See for example U.S. Pat. No. 2,979,599, issued to Robert B. Width, Apr. 11, 1961, for "Multiple Electrode Holder", and U.S. Pat. No. 3,558,848, issued to Robert B. Width, Jan. 26, 1971, for "Electric Resistance Welding Electrode Holder Three Electrodes in Balanced Force Contact".

SUMMARY OF THE INVENTION

This invention is concerned with an improved spot welding multi-electrode holder for equalizing the electrode tip pressure on the workpiece In one embodiment, multiple electrodes are mounted on a holder having an inner chamber. Fifteen hundred small copper ball bearings fill the chamber. The ends of the electrodes are disposed in the chamber such that as the holder is moved toward the workpiece. The electrode shanks automatically self-adjust their relative positions to eliminate any uneven pressure when the tips engage the workpiece.

Another embodiment of the invention comprises, for illustrative purposes, four electrodes, each having a shank with a semispherical inner end. The ends of each pair of shanks are seated on a relatively small copper plate. Each of the two smaller plates is mounted on a copper ball, the electrodes being disposed on opposite sides of the ball like a teeter-totter. The two balls then are seated on a third larger copper plate. The third plate is mounted on a larger copper ball so the two smaller balls are mounted like a teeter-totter on the larger ball. The arrangement is such that when the four electrodes engage the workpiece, any uneven pressure between the electrodes tilts the plates in such a manner as to equalize the pressure between the four electrode shanks. The concept is equally applicable to holders having other electrode multiples.

Another embodiment of the invention comprises a self-adjusting holder for balancing the pressure of two electrodes. The two electrodes are each slidably movable along their respective longitudinal axis in the holder body. A ball is mounted between the two electrodes. A plate has a dished midsection slidably mounted on the ball and rounded ends slidably engaged with rounded recesses in the two electrodes. The electrodes tilt the plate about the ball like a teeter-totter. The motion of one electrode moving in one direction, e.g., away from the workpiece, is transmitted through the plate so the other electrode moves in the opposite direction until the pressure of the two electrodes on the workpiece is balanced.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENTS

Figure 1:
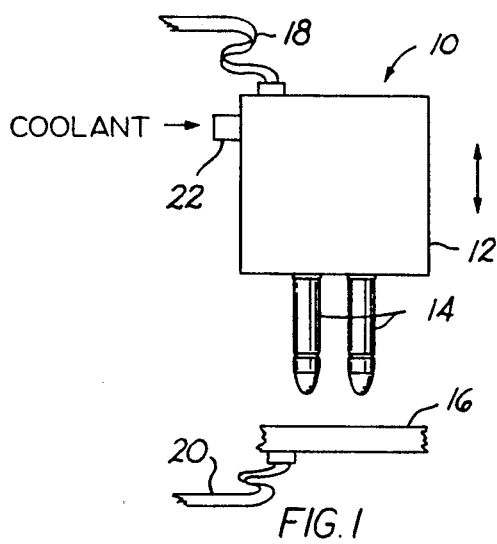
FIG. 1 illustrates a multiple electrode spot-welding holder illustrating the preferred embodiment of the invention.

Referring to the drawings, FIG. 1 illustrates a multiple electrode welding apparatus 10 having an electrode holder 12 with upper electrode means 14 mounted above lower electrode means 16. When a workpiece is disposed between the upper and lower electrodes, the holder is lowered so the electrode tips engage the workpiece in the manner well known to those skilled in the art, and then raised to permit removal of the workpiece.

An electrical shunt strap 18 is connected to the upper holder, and a lower electrical shunt strap 20 is connected to the lower electrode to deliver the appropriate current.

Coolant means, from a source not shown, is delivered to a nipple 22 to the holder to remove heat generated from the welding process. The coolant passes through internal passages 23 in the manner well known to those skilled in the art, and then passes from the body through another nipple and conduit (not shown).

Figure 2:
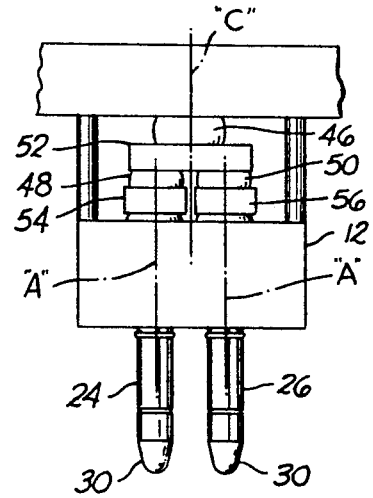
FIG. 2 is a view of the holder of FIG. 1 with part of the housing removed.
Figure 3:
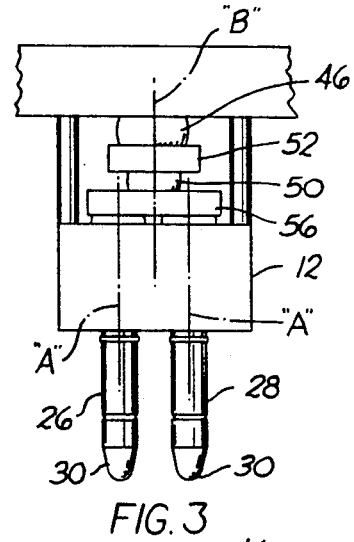
FIG. 3 is a view as seen from the right side of FIG. 2.
Figure 4:
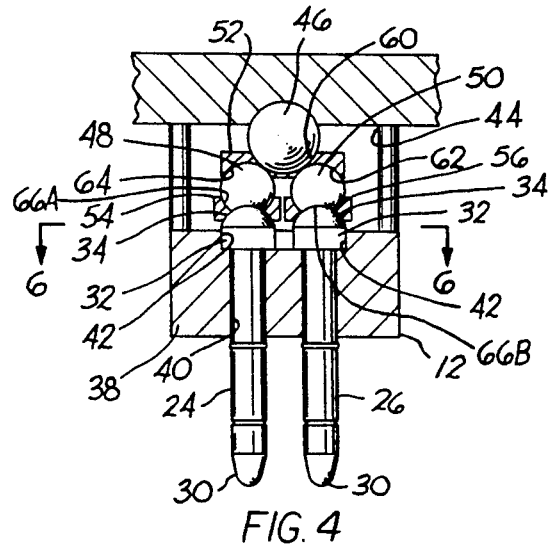
FIG. 4 is a view similar to FIG. 2 but in which the holder is shown in section to illustrate two of the electrode shanks.
Figure 6:
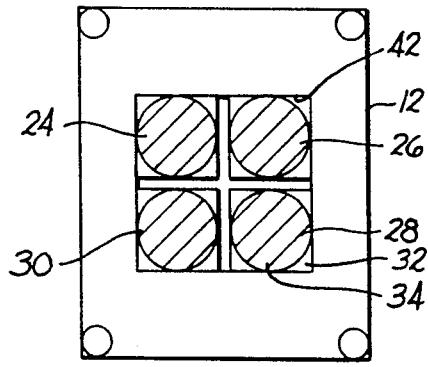
FIG. 6 is a view as seen along lines 6—6 of FIG. 4.

FIGS. 2–4 and 6 illustrate holder 12 with part of the housing removed to show the upper, inner ends of electrodes 24 and 26. The holder supports four electrodes 24, 26, 28 and 30. Each electrode shank is made of silver-plated copper with a rod-like configuration. A bullet-shaped copper tip 30 is carried on the end of each shank for engaging the workpiece. The upper, inner end of each shank has an enlarged section 32 with a generally square cross-section, and a semi-spherical end 34, as best illustrated in FIGS. 4 and 6. The electrode shanks have an equal length.

Holder 12 is made of an electrically-conductive material, such as copper, and has a thickened section 38 with a bore 40 for slidably supporting each electrode shank. Thus there are four parallel bores for slidably supporting the four electrode shanks along their longitudinal axes along parallel paths of motion.

Referring to FIG. 6, thickened section 38 has a generally rectangular recess 42 receiving the squared sections 32 of the four electrodes, preventing the electrodes from rotating about their longitudinal axis'.

The holder has an inner chamber 44 supporting a relatively large copper ball 46, a pair of smaller copper balls 48 and 50, a large copper tilt plate 52 and a pair of smaller copper tilt plates 54 and 56. For illustrative purposes, the larger ball 46 has a 25.4 mm. spherical radius. The two smaller balls 48 and 50 each has a 19.05 mm. spherical radius, and the inner ends 34 of each electrode have a 19.05 mm. spherical radius.

The upper surface of tilt plate 52 has a partially spherical seat 60 formed on a spherical radius identical to that of ball 46. The lower support tilt plate 52, as viewed in FIG. 4, has a pair of partially spherical seats 62 and 64 formed with the same radius as balls 48 and 50. The upper surface of each smaller tilt plate has two seats, 66A and 66B, one for each of the smaller balls. The lower surface each of the two smaller plates has a pair of seats 32A and 32B (FIG. 5) one for each of the spherical ends of the electrode shanks.

As can be seen in FIG. 4, the longitudinal axis "A" of electrode shanks 26 and 28 are disposed an equal distance on opposite sides of a plane "B" containing the centerline of both the small balls and the large ball. Electrodes 26 and 28 are balanced like a teeter-totter on tilt plate 56 and ball 46. Similarly, electrodes 24 and 30 are balance on tilt plate 54 like a teeter-totter.

Referring to FIG. 2, the longitudinal axis "A" of each pair of electrode shanks and their respective tilt plates are disposed on opposite sides of a plane "C" passing through the larger ball, between and parallel to the two smaller tilt plates.

The distance between the center of spherical seats 32A and 32B on each of the smaller tilt plates is 22.80 mm. The distance between seats 66A and 66B on the two adjacent tilt plates, as shown in FIG. 2, i.e., the distance between the longitudinal axis of electrodes 24 and 26 is 22.78 mm. The distance between plane "B" and centerlines "A" as shown in FIG. 3 is 12.70 mm. The spherical radius on each end of the electrodes is 19.05 mm. The center of each smaller ball is disposed midway between the two electrodes shanks engaging the same tilt plate (FIG. 3) while the larger ball is disposed about an axis that is midway between the centerlines of the two smaller balls as illustrated in FIG. 2. The seats in each tilt plate accommodating the balls and the spherical shank ends are each made to form a sliding fit with its mating spherical structure to maximize the electrical contact between the balls and the plates. Preferably, each of the smaller tilt plates is 9.50 mm. thick. The seat for each smaller ball is recessed 6.35 mm. from the surface of each tilt plate, while the seat for the larger ball on the larger tilt plate is 6.35 mm. from the upper surface of the larger plate. The seat for the large ball on the holder is preferably recessed 8.89 mm. from the surface of the holder body.

In operation, the holder is moved toward the workpiece, until the electrode tips contact the workpiece. When the tips are unworn, and the workpiece is perfectly flat, that is, disposed in a plane perpendicular to the motion of the holder. The four electrodes will simultaneously engage the workpiece, providing an even pressure on the workpiece and therefore evenly splitting the current to the welding tips.

However, should one of the electrodes contact a high spot on the workpiece, the tip will remain stationary while the holder continues its downward motion. The motionless electrode will tilt its tilt plate. This tilting motion will, in turn, be transmitted through the two balls and the other two tilt plates so that the other electrodes move in their respective bores, that is, adjust their position in the holder to equalize the pressure of each tip on the workpiece.

Figure 5:
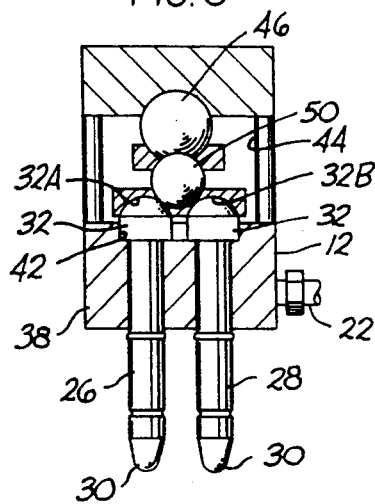
FIG. 5 is a view similar to FIG. 4 but as seen from the right side of FIG. 4.

For example, referring to FIGS. 4 and 5, should electrode 26 contact the workpiece before the other electrodes, the continued downward motion of the holder will raise one end of plate 56. Tilt plate 56 then pushes small ball 50 toward the right, as viewed in FIG. 5. This in turn raises the right end of the larger tilt plate and biases the other small ball and the other tilt plate so that the electrodes move to a balanced position depending upon the final position of electrode 26 with respect to the holder.

Figure 7:
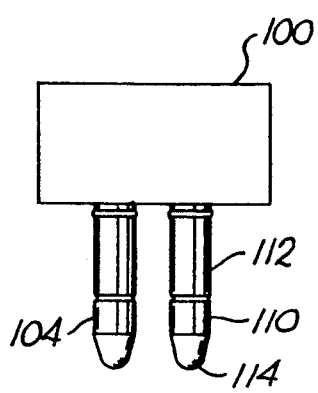
FIG. 7 is a view of a multiple electrode holder illustrating another embodiment of the invention.
Figure 8:
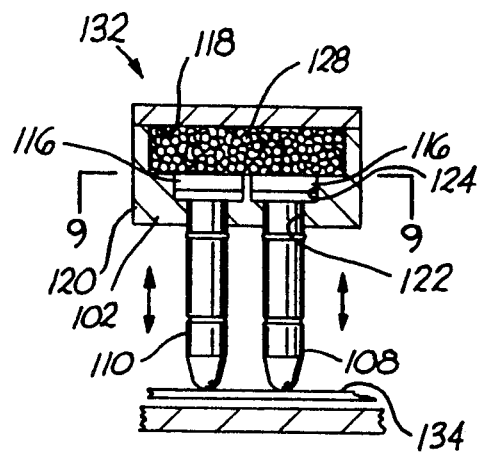
FIG. 8 is a sectional view of the embodiment of FIG. 7.
Figure 9:
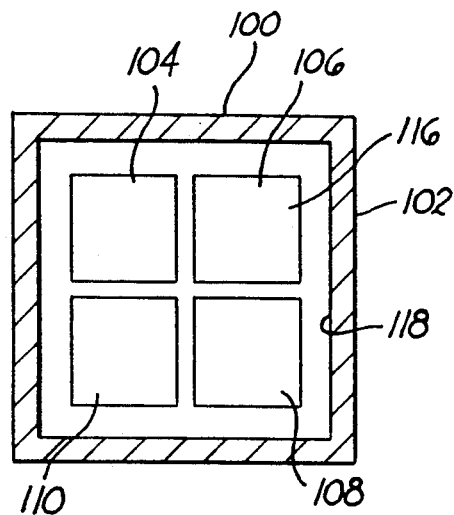
FIG. 9 is a view generally as seen along lines 9—9 of FIG. 8.

Referring to FIGS. 7, 8 and 9, another spot welding electrode holder 100 is illustrated having a body 102. Four copper electrode shanks 104, 106, 108 and 110 are slidably mounted in holder body 102. The four electrode shanks are identical in shape and length. Each shank has a silver-plated copper rod 112 and a copper tip 114. Each shank has an enlarged square inner piston 116. Body 102 has a closed internal chamber 118 and a thickened section 120. The thickened section has four bores, one bore for each shank so that each shank is slidably mounted in its respective bore. Two typical bores are illustrated at 122 in FIG. 8. The four shanks are slidably mounted along parallel longitudinal axes.

Body 102 has four square pockets or cavities 124 adjacent the inner end of each bore 122. Each cavity has a depth substantially the same as the thickness of the piston-shaped ends of the electrodes. Each piston is slidably mounted in its respective cavity and prevents its electrode shank from being rotated about its longitudinal axis. The four cavities open into chamber 118.

A bed of 1500 steel ⅛" diameter ball bearings 128 are disposed in chamber 118. The electrodes are each mounted in the holder a short distance above the bottom of its cavity so that the four electrodes can float in their respective bores. The remainder of the chamber is then filled with the ball bearings.

FIG. 8, illustrates holder 100 acting under the influence of a force 132 toward a workpiece 134. The electrode tips form four spot welds in the workpiece.

All of the holder components are electrically conductive so that the electrodes deliver a current in the conventional manner to the workpiece when a force 132 acting toward the workpiece moves the four electrodes until they contact the workpiece. Assuming the workpiece is not uniformly thick, the four electrodes will each apply a uniform pressure on the workpiece because the piston of each electrode automatically moves with respect to the balls to compensate for differences in thicknesses of the workpiece as the ball bearings shift in chamber 134.

For example, should electrode 108 contact a high point in the workpiece as the holder is moving downwardly, electrode 108 will stop its downward motion before the other electrodes. As the holder continues its downward motion, the holder body causes some ball bearings above electrode 108 to shift laterally toward positions above other electrodes, until the holder has completed its downward stroke. The ball bearings automatically equalize the pressure of each electrode on the workpiece, and consequently equalize the electrical current delivered by each electrode. The concept can be applied to any number of electrodes.

The diameter of the ball bearings is selected as a compromise between a larger diameter that permits the electrodes to be easily adjusted, and a smaller diameter that provides more ball to ball contact for a better electrical current flow.

This version of the invention also includes the holder body having internal coolant passages (not shown).

Figure 10:
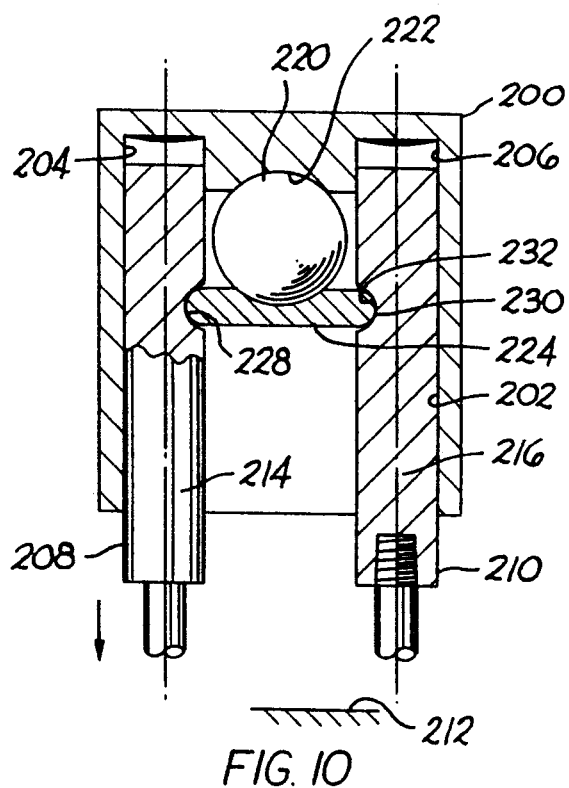
FIG. 10 is a sectional view through another embodiment of the invention in which a pair of electrodes engages a tilt plate mounted on a single ball.
Figure 11:
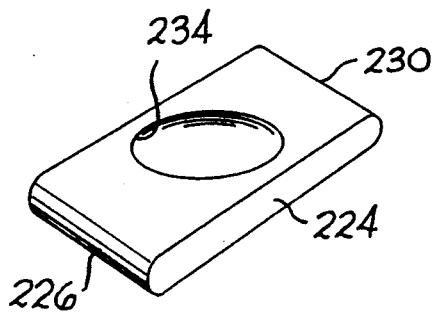
FIG. 11 is a view of the tilt plate of FIG. 10.

FIGS. 10 and 11 illustrate another embodiment of t e invention in which a spot welding holder 200 of electro-conductive material, such as oopper, has an internal openinq 202. The upper end of the opening has a pair of internal, spaced bores 204 and 206. A pair of electrode means 208 and 210 are slidably movable in bores 204 and 206 with respect to a workpiece 212. The two electrode means are movable along spaced parallel paths of motions 214 and 216, respectively.

A copper ball 220 is mounted in holder 200 between the two electrode means and functions as a fulcrum. The ball is slidably mounted in a dished cavity 222 having a surface complementing that of the spherical surface of the ball.

Tilt plate 224 is mounted between the two electrodes. The tilt plate has one rounded edge 226 slidably mounted in a rounded groove 228 in electrode 208. The radius of the groove and edge are complementary so that they form a sliding engagement. The opposite end of the tilt plate has a rounded edge 230 that is slidably mounted in a rounded groove 232. The radius of groove 232 and the 230 are complementary so that they form a sliding engagement. The midsection of the tilt plate has a dished recess 234 formed with a partially spherical surface complementing the spherical surface of ball 220 so that the ball forms a sliding fit with recess 234.

Holder 200 is lowered toward workpiece 212 to form two spot welds. Assuming electrode 210 meets a high spot on the workpiece before electrode 208 has fully contacted the workpiece, electrode means 210 remains stationary. The holder continues to be lowered pushing ball 220 downwardly. The ball pushes the left end of th tilt plate downwardly, thereby pushing electrode means 208 down until it contacts the workpiece.

Thus the embodiment of FIG. 10 illustrates a self-adjusting pair of spot welding electrodes that automatically adjust their position as the electrodes engage the workpiece so as to apply an even pressure on the spot welds as well as evenly dividing the current to the two welds.

It is to be understood that I have described several improved holders for supporting multiple electrodes which automatically compensate for irregularities in the thickness of a workpiece being spot welded, by using one or more balls between the various electrodes.

Having described my invention, I claim:

1. In a multiple electrode spot welding apparatus for simultaneously spot welding a plurality of spaced areas with a substantially equal welding pressure, the combination comprising:

a holder;

a first electrode of an electrically-conductive material adapted to engage a workpiece;

a second electrode of an electrically-conductive material adapted to engage said workpiece;

first means on the holder for guiding the first electrode for reciprocal motion along a first path of motion;

second means on the holder for guiding the second electrode for reciprocal motion along a second path of motion;

ball means, and means on the holder for supporting said ball means in engagement with the first electrode and the second electrode such that a motion of the holder toward the workpiece, when the first electrode is engaged with the workpiece, urges the second electrode toward the workpiece until the pressure applied thereon by the first and second electrodes is substantially equal.

2. A combination as defined in claim 1, in which the ball means comprise a plurality of electrically-conductive balls forming an electrical path between the holder, the first electrode and the second electrode.

3. A combination as defined in claim 1, in which the first and second electrodes each have a partially spherical end, and the ball means include:

a first ball spaced from the partially spherical ends of the first and second electrodes;

a first tilt plate disposed between the partially spherical ends of the first and second electrodes and the first ball, the first tilt plate having a first side facing and slidably engaging the partially spherical ends of the first and second electrodes, and an opposite side slidably engaging the first ball in a teeter-totter manner;

a second ball;

a second tilt plate having a first side facing and slidably engaging the first ball, and an opposite side facing and slidably engaging the second ball;

whereby a motion of the first electrode with respect to the holder as the holder is moved toward the workpiece is transmitted through the first and second tilt plates to the second electrode to produce a corresponding motion of the second electrode with respect to the holder.

4. A combination as defined in claim 3, in which each of said balls is formed of an electrically-conductive material.

5. A combination as defined inc laim 3, including a third tilt plate, a third electrode and a fourth electrode, means on the holder for supporting the third electrode for motion along a third path of motion, means on the holder for supporting the fourth electrode for motion along a fourth path of motion, and the third and fourth electrodes each have an end with a partially-spherical configuraiton, the partially-spherical ends of the third and fourth electrodes being slidably engaged with the third tilt plate, and including a third ball mounted between the third tilt plate and the second tilt plate in such a manner that as the holder is moved toward the workpiece when the first electrode is in contaft with the workpiece, the holder biases the other electrodes toward a position along their respective paths of motion so as to balance the pressure of each electrode on the workpiece.

6. A combination as defined inc ilam 3, in which each of the tilt plates has a partially spherical seat formed with a radius corresponding to the radius of the spherical surface of the ball disposed in the seat.

7. A combination as defined inc ailm 3, in which the longitudinal axes of the first and second electrodes are laterally spaced on opposite sides of the center of the first ball, and the first tilt plate is disposed between the first ball and the spherical ends of the electrodes so as to be tilted about hte first ball as the electrodes are being moved along their respective paths of motion.

8. A combination as defined in claim 3, in which the first and second balls are so located that as the first electrode applies an longitudinal pressure on a workpiece greater than the longituidnal pressure on the workpiece of the second electrode, the holder moves toward the workpiece until the longitudinal pressure of the two electrodes on the workpiece is substantially equal.

9. A combination as define din claim 1, in which the electrodes are each moveable along spaced, parallel axis of motion.

10. A combination as defined in cailm 1, including means for delivering a liquid coolant to the holder for removing heat generated by the spot welding process.

11. A combination as define din claim 1, in which the holder has a chamber, the ends of the electrodes are disposed so as to form a movable wall in the chamber, and the ball means comprise a plurality of balls filling the chamber and engaging the electrode ends in such a manner that as one of the electrodes is moved toward the chamber, the other electrode is urged a corresponding distance away from the chamber.

12. A combinaiton as defined in claim 11, inw hich the electrodes are each moveable along their respective paths of motion, and the ends thereof are disposed in a bed of electrically-conductive baslls havinga depth in the direction of travel of the electrodes greater than the distance the electrodes move along their respective paths of motion.

13. A combination as defined in claim 12, in which each of said electrodes is movable on the holder in a direction along the longitudinal axis of the electrode, and including means on the holder for restraining the electrode against rotation about its longitudinal axis.

14. A combination as defined in claim 11, in which the ends of the electrodes engaging the balls have a generally planar surface.

15. A combination as defined in claim 14, in which the ends of the electrodes are several times the diameter of the balls.

16. A combination as defined in claim 1, which the ball means comprises a single ball.

17. A spot welding holder for supporting a pair of spaced, elongated spot welding electrodes in a substantially equal welding pressure on a workpiece comprising:
 a body having a pair of spaced parallel bores;
 a first electrode means slidably disposed in the first bore for motion along a first path of motion;
 a second electrode means slidably disposed in the second bore for motion along a second path of motion generally parallel to the first path of motion;
 fulcrum structure having at least a partially spherical surface disposed between the first and second electrode means;
 a tilt member having a first end engaged with the first electrode means, and a second end engaged with the second electrode means so as to span the distance between said first and second electrode means, the tilt member being slidably mounted on the spherical surface of the fulcrum structure such that as the first electrode means moves in one direction along said first path of motion with respect to the holder, the second electrode means moves in the opposite direction along said second path of motion with respect to the holder.

18. A combination as defined in claim 17, in which the structure comprises a ball.

19. A combination as defined in claim 17, in which the first end and the second end of the tilt member each form a slidable engagement with the first and second electrode means.

20. A combination as defined in claim 17, in which the tilt member comprises a plate having a dished midsection slidably mounted on the spherical surface of the structure.

* * * * *